United States Patent
Kim et al.

(10) Patent No.: US 9,288,466 B2
(45) Date of Patent: Mar. 15, 2016

(54) METHOD AND APPARATUS FOR DETERMINING A VIDEO COMPRESSION STANDARD IN A 3DTV SERVICE

(75) Inventors: Sung Hoon Kim, Daejeon (KR); Suk Hee Cho, Daejeon (KR); Kyung Ae Moon, Daejeon (KR); Jin Soo Choi, Daejeon (KR); Jin Woong Kim, Daejeon (KR); Dong Wook Kang, Seoul (KR); Kyeong Hoon Jung, Seoul (KR)

(73) Assignees: Electronics and Telecommunications Research Institute, Daejeon (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 351 days.

(21) Appl. No.: 13/885,143

(22) PCT Filed: Nov. 10, 2011

(86) PCT No.: PCT/KR2011/008557
§ 371 (c)(1),
(2), (4) Date: May 13, 2013

(87) PCT Pub. No.: WO2012/064123
PCT Pub. Date: May 18, 2012

(65) Prior Publication Data
US 2013/0235159 A1 Sep. 12, 2013

(30) Foreign Application Priority Data

Nov. 12, 2010 (KR) .................. 10-2010-0112753
May 6, 2011 (KR) .................. 10-2011-0043134
Oct. 7, 2011 (KR) .................. 10-2011-0102500

(51) Int. Cl.
*H04N 13/00* (2006.01)
*H04N 21/2343* (2011.01)
(Continued)

(52) U.S. Cl.
CPC ....... *H04N 13/0007* (2013.01); *H04N 21/2365* (2013.01); *H04N 21/234327* (2013.01); *H04N 21/4307* (2013.01); *H04N 21/4347* (2013.01)

(58) Field of Classification Search
CPC .................. H04N 13/0007; H04N 21/234327; H04N 21/2365; H04N 21/4307; H04N 21/4347
USPC .......................................................... 348/43
See application file for complete search history.

(56) References Cited

U.S. PATENT DOCUMENTS

| 8,773,505 | B2* | 7/2014 | Nandhakumar et al. ........ 348/43 |
| 2007/0130603 | A1* | 6/2007 | Isomura ............... H04N 5/4401 725/131 |

(Continued)

FOREIGN PATENT DOCUMENTS

| KR | 1020080063323 A | 7/2008 |
| KR | 1020100049873 A | 5/2010 |

(Continued)

*Primary Examiner* — Behrooz Senfi
(74) *Attorney, Agent, or Firm* — William Park & Associates Ltd.

(57) ABSTRACT

A method and apparatus for determining an image compression format of a 3-dimensional television (3DTV). The method may include encoding a high-quality image and transmitting the encoded high-quality image through a first channel, determining an image compression format in which a resolution of the encoded low-quality image is higher than or equal to a reference value in comparison to the high-quality image, and encoding the low-quality image according to the determined image compression format and transmitting, the encoded low-quality image through a second channel.

26 Claims, 7 Drawing Sheets

(51) Int. Cl.
*H04N 21/2365* (2011.01)
*H04N 21/43* (2011.01)
*H04N 21/434* (2011.01)

(56) References Cited

U.S. PATENT DOCUMENTS

2010/0141738 A1  6/2010  Lee et al.
2011/0023066 A1* 1/2011  Jang et al. .................. 725/54
2011/0090314 A1* 4/2011  Lee et al. ..................... 348/46
2011/0181694 A1* 7/2011  Kim et al. ..................... 348/43
2011/0222605 A1* 9/2011  Kashiwagi et al. ....... 375/240.16
2012/0027100 A1* 2/2012  Park et al. ................ 375/240.26
2012/0133736 A1* 5/2012  Nishi et al. ................... 348/43

FOREIGN PATENT DOCUMENTS

KR    1020100072673 A    7/2010
WO       2010126227 A2   4/2010

\* cited by examiner

METHOD AND APPARATUS FOR DETERMINING A VIDEO COMPRESSION STANDARD IN A 3DTV SERVICE

TECHNICAL FIELD

The present invention relates to a method and apparatus to determine an image compression format of a 3-dimensional television (3DTV), and more particularly, to a technology to determine an image compression format of a 3DTV that uses both fixed broadcasting and mobile broadcasting and to synthesize images into a 3D stereo image.

BACKGROUND ART

An advanced television systems committee mobile/handheld (ATSC service logically shares one physical channel with standard ATSC broadcasting such as an 8-vestigial side band (VSB). The ATSC M/H service uses portion of a total bandwidth of about 19.39 megabits per second (Mbps), and provides a terrestrial broadcasting service to users of a mobile or portable TV by transmission through an internet protocol (IP) transport. That is, through time-sharing of an M/H frame of about 19.39 Mbps constructed by an 8-VSB packet and an M/H packet, the two foregoing services may be provided independently and simultaneously. Here, the 8-VSB packet is received and processed in a fixed reception environment and used for providing a standard ATSC broadcasting service. The M/H packet is received and processed by a mobile or portable receiver and used for providing an audio/video (A/V) service independently of the 8-VSB.

Thus, methods of providing the 3DTV service presupposing real-time broadcasting in an in-band transmission broadcasting environment include 1) a method of transmitting left and right image information through an 8-VSB channel, 2) a method of transmitting left and right image information through an M/H channel, and 3) a method of transmitting left and right image information through both the 8-VSB channel and the M/H channel, as shown in Table 1.

TABLE 1

| Scenario | HDTV | SDTV | Mobile | 3DTV |
|---|---|---|---|---|
| 1. HD only Service | 19.2 Mbps | | | |
| 2. HD and Mobile | 16.2 Mbps | | 3 Mbps | |
| 3. SDTV and 3DTV | | 4.7 Mbps | | 14.5 Mbps |
| 4. SDTV, Mobile and 3DTV | | 4.7 Mbps | 3 Mbps | 11.5 Mbps |
| 5. HDTV plus 3D enhancement | 12 Mbps | | | 7.2 Mbps |
| 6. HDTV, Mobile and 3D enhancement | 10.1 Mbps | | 3 Mbps | 6.1 Mbps |
| 7. SDTV, HDTV(AVC) and/or 3DTV(advanced codec) | | 4.7 Mbps | | 14.5 Mbps |
| 8. SDTV, Mobile, HDTV(AVC) and/or 3DTV(advanced codec) | | 4.7 Mbps | 3 Mbps | 11.5 Mbps |

In a case of the method 1) in which a stereo image including a left image and a right image is transmitted through only the M/H channel, a mobile 3DTV service is available. However, it is difficult to provide image quality equivalent to a high-definition (HD) level due to a narrow bandwidth of the M/H channel.

In a case of the method 2) in which the stereo image is transmitted through only the 8-VSB channel, an HD level service may be achieved since the 8-VSB channel has a wider bandwidth than the M/H channel. At this time, the left image may be compressed by a moving picture expert group (MPEG)-2 to maintain reverse compatibility with the conventional ATSC method. However, when the left image is compressed by MPEG-2, the left image is encoded using only 62.5% or 52.6% of the bandwidth of the conventional ATSC method. Therefore, a reduction in image quality of an HDTV may often occur. For example, in Table 1 above, the 62.5% bandwidth may be used in compressing the left image by MPEG-2 without using the M/H service according to Scenario 5 of Table 1. Also, according to Scenario 6 of Table 1, 52.6% of the bandwidth may be used in compressing the left image by MPEG-2 without using the M/H service.

In addition, in a case of the method 3) in which the stereo image is transmitted through both the 8-VSB channel and the M/H channel in a dividing manner, high image quality may be achieved in comparison to the cases using only the 8-VSB channel or the H/m channel. However, due to a great difference in the bandwidth between the 8-VSB channel and the M/H channel, encoding of the right image to the HD level is difficult. Accordingly, when an HD-level stereo image is compressed and transmitted, the right image restored by an image receiver may have a lower resolution and image quality than that of the left image. As a consequence, due to a reduction in the image quality of the restored right image, a subjective image quality of a 3D stereo image generated by synthesizing the restored left image and right image would be reduced.

Therefore, there is a demand for a technology for maintaining reverse compatibility with conventional TSC 8-VSB and ATSC M/H systems while minimizing reduction in a spatio-temporal resolution of left and right images, imbalance in image quality, and reduction in image quality of a 3D stereo image, with regard to transmission of a stereo image using the 8-VSB channel and the M/H channel which are logically separated in one physical channel.

DISCLOSURE OF INVENTION

Technical Goals

An aspect of the present invention provides a method and apparatus for determining an image compression format capable of reducing an imbalance in a resolution and image quality, the imbalance caused by a channel bandwidth difference, when a stereo image is transmitted through a fixed broadcasting channel and a mobile broadcasting channel.

Another aspect of the present invention provides a method and apparatus for synthesizing a 3-dimensional (3D) stereo image, the method and apparatus capable of reducing reduction in image quality of the synthesized 3D stereo image by restoring an encoded low-quality image by the determined image compression format.

Technical Solutions

According to an aspect of the present invention, there is provided a method of determining an image compression format, the method including encoding a high-quality image with respect to a 3-dimensional (3D) stereo image constituted by the high-quality image and a low-quality image, determining an image compression format in which a resolution of the encoded low-quality image is higher than or equal to a reference value in comparison to the high-quality image, encoding the low-quality image according to the determined image compression format, transmitting the encoded high-quality image through a first channel, and transmitting the encoded low-quality image through a second channel.

The determining of the image compression format may include calculating an average power of quantization noise ratio of the encoded low-quality image, calculating an average power of quantization noise ratio of the encoded high-quality image, and determining whether the average power of the low-quality image is higher than or equal to a predetermined number times the average power of the high-quality image.

The encoding of the low-quality image may include generating additional information of the low-quality image during encoding of the low-quality image, and encoding the generated additional inform at on by a B-slice mode.

The method may further include transmitting the encoded additional information through any one of the first channel and the second channel. Here, the additional information may include at least one of enhancement layer information of a scalable video codec (SVC), 3D depth information, disparity map information, multiview 3D depth information, and multiview 3D image information.

The method may further include transmitting sync information used for restoring the 3D stereo image by synthesizing the high-quality image transmitted through the first channel and the low-quality image transmitted through the second channel.

The high-quality image may be one of the high-quality image and the low-quality image whereas the low-quality image may be a remaining one of the high-quality image and the low-quality image, except the image corresponding to the high-quality image.

The first channel may include a fixed broadcasting channel used for transmitting the high-quality image, and the second channel may include a mobile broadcasting channel used for transmitting the low-quality image. For example, the first channel may include an 8-vestigial side band (8-VSB) channel, a digital video broadcasting-terrestrial (DVB-T) channel, a DVB-T2 channel, an integrated service digital broadcasting-terrestrial (ISDB-T) channel, a DVB-Satellite 2 (DVB-S2) channel, and an ISD-terrestrial mobile multimedia (ISDB-Tmm) channel. The second channel may include an advanced television systems committee mobile/handheld (ATSC M/H) channel, a DVB-handheld (DVB-H) channel, a DVB-T2 mobile channel, a DVB-next generation handheld (DVB-NGH) channel, an ISDB-T oneseg channel, an ISDB-Tmm channel, and a DVB-satellite services to handheld (DVB-SH) channel.

According to another aspect of the present invention, there is provided an apparatus for determining an image compression format, the apparatus including a high-quality image encoding unit to encode a high-quality image with respect to a 3-dimensional (3D) stereo image constituted by the high-quality image and a low-quality image, and to transmit the encoded high-quality image through a first channel, an image compression format determining unit to determine an image compression format in which a resolution of the encoded low-quality image is equal to or higher than a reference value in comparison to the high-quality image, and a low-quality image encoding unit to encode the low-quality image according to the determined image compression format and to transmit the encoded high-quality image through a second channel.

According to another aspect of the present invention, there is provided a method of synthesizing a 3-dimensional (3D) stereo image, the method including obtaining a transmission stream by demodulating a broadcasting signal, separating a high-quality image packet, a low-quality image packet, and an additional information packet by demultiplexing the transmission stream, storing the separated high-quality image packet, low-quality image packet, and additional information packet in a frame buffer, restoring a high-quality image by decoding the high-quality image packet, restoring a low-quality image by decoding the low-quality image packet and the additional information, synthesizing the restored high-quality image and the restored low-quality image based on sync information, and displaying the 3D stereo image restored through the synthesizing.

The broadcasting signal may include the low-quality image encoded based on at least one of a resolution of the encoded low-quality image and an average power of quantization noise ratio of the encoded low-quality image.

The sync information may include presentation time stamp (PTS) information, and may be inserted in a header of the high-quality image packet, in a time stamp field of the low-quality image packet, and in a header of the additional information packet.

According to another aspect of the present invention, there is provided an apparatus for synthesizing a 3-dimensional (3D) stereo image, the apparatus including a demodulator to obtain a transmission stream by demodulating a broadcasting signal, a demultiplexing unit to separate a high-quality image packet, a low-quality image packet, and an additional information packet by demultiplexing the transmission stream, a high-quality image decoding unit to restore a high-quality image by decoding the high-quality image packet, a low-quality image decoding unit to restore a low-quality image by decoding the low-quality image packet and the additional information, an image synthesizing unit to synthesize the restored high-quality image and the restored low-quality image based on sync information, and a 3D audio and video (A/V) display unit to display the 3D stereo image generated through the synthesizing.

Effect of Invention

According to the embodiment of the present invention, an image compression format is determined based on a resolution of an encoded low-quality image and the low-quality image is encoded by the determined image compression format and transmitted. Therefore, imbalance in a resolution and image quality caused by a channel bandwidth difference may be reduced.

In addition, an apparatus and method for synthesizing a 3-dimensional (3D) stereo image according to the embodiment of the present invention may minimize reduction in image quality of the synthesized 3D image, by restoring the encoded low-quality image according to the determined image compression format.

BEST MODE FOR CARRYING OUT THE INVENTION

Reference will now be made in detail to embodiments of the present invention, examples of which are illustrated in the accompanying drawings, wherein like reference numerals refer to the like elements throughout. However, the present invention is not limited to the embodiments.

A system for transmitting and receiving a stereo image, according to an embodiment of the present invention, may provide a 3-dimentional television (3DTV) service of a high image quality using both a first channel and a second channel which in are logically multiplexed in one physical channel. The first channel refers to a fixed broadcasting channel or a satellite broadcasting channel that transmits images to a fixed terminal. The first channel may include various channels such as an 8-vestigial side band (8-VSB) channel, a digital video broadcasting-terrestrial (DVB-T) channel, a DVB-T2 channel, a DVB-Satellite 2 (DVB-S2) channel, an integrated service digital broadcasting-terrestrial mobile multimedia (ISDB-Tmm) channel, and an ISDB-T channel. The second channel refers to a mobile broadcasting channel that transmits images to a mobile or portable terminal. The second channel may include various channels such as an advanced television systems committee mobile/handheld (ATSC M/H) channel, a DVB-handheld (DVB-H) channel, a DVB-T2 mobile channel, a DVB-next generation handheld (DVB-NGH) channel, an ISDB-T one-seg channel, an ISDB-Tmm channel, and a DVB-satellite services to handheld (DVB-SH) channel.

Hereinafter, the 8-VSB channel, one of the fixed broadcasting channels, will be explained as the first channel, and the ATSC M/H channel, one of the mobile broadcasting channels, will be explained as the second channel. However, this is presumed only for easier understanding of the present disclosure. That is the first channel and the second channel are not limited to the 8-VSB channel and the ATSC M/H channel.

Figure 1:
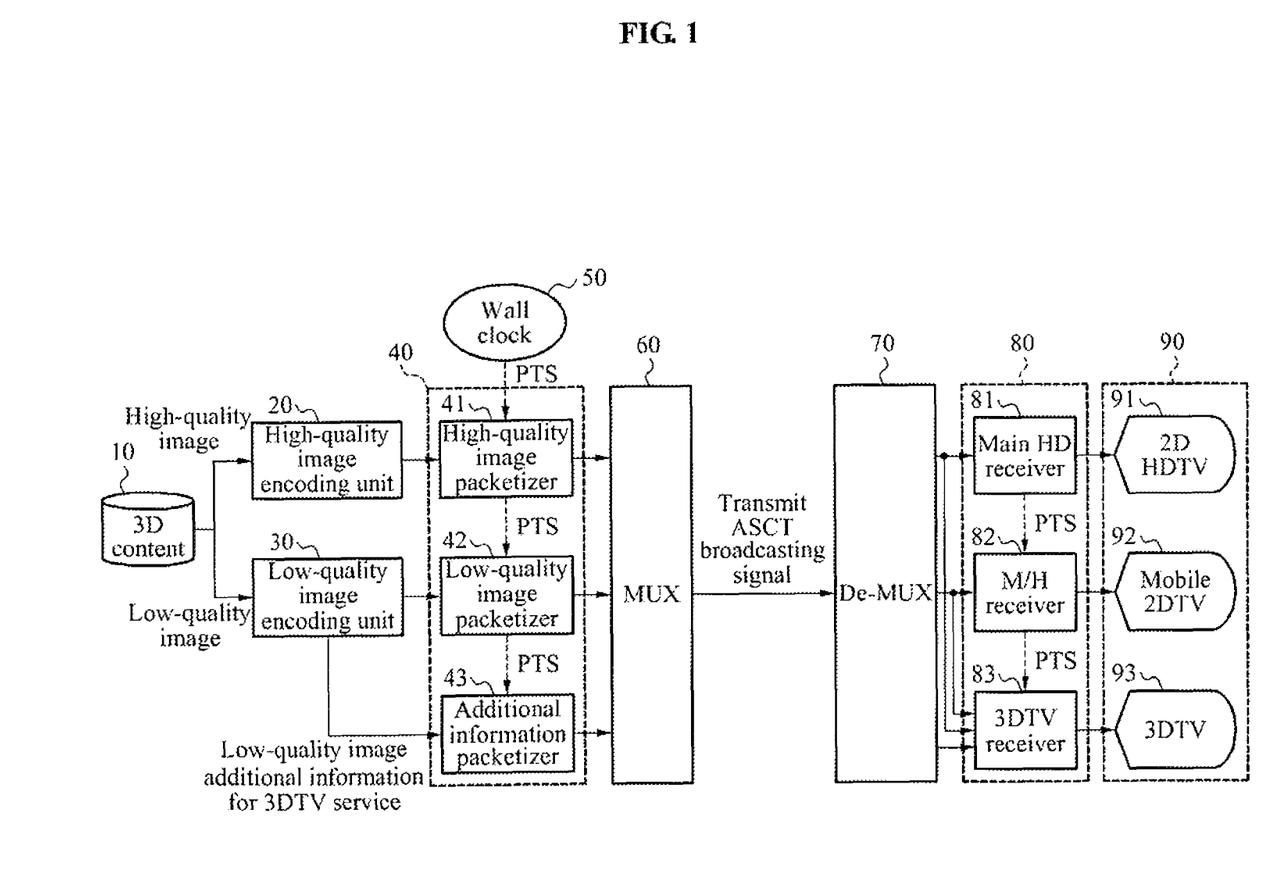
FIG. 1 is a view illustrating an overall structure of a system that receives and transmits a stereo image, according to an embodiment of the present invention.

FIG. 1 illustrates an overall, structure of a system that receives and transmits a stereo image, according to an embodiment of the present invention. The image transmitting and receiving system illustrated in FIG. 1 abides by the ATSC A/153 standard. Therefore, the image transmitting and receiving system of FIG. 1 may provide a fixed broadcasting service and a mobile broadcasting service defined by the ATSC A/153 as before.

That is, the image transmitting and receiving system of FIG. 1 may transmit a high-quality image, equivalent to a high definition (HD) level compressed by maximum 16 megabits per second (Mbps) of data rate, through the first channel. In addition, the image transmitting and receiving system may transmit a low-quality image compressed at a considerably low data rate when compared to the high-quality image, through the second channel. For example, the fixed broadcasting service may include an 8-VSB service and the mobile broadcasting service may include an M/H service.

Also, the first channel may include the 8-VSB channel which is one of the fixed broadcasting channels while the second channel includes the M/H channel which is one of the mobile broadcasting channels. Here, the high-quality image refers to an image of at least the HD-level that supports the fixed broadcasting service or a satellite broadcasting service.

One of the high-quality image and the low-quality image constituting a 3D stereo image may be used as the high-quality image. In this case, the low-quality image may refer to an image that supports a mobile broadcasting service. The other image of the high-quality image and the low-quality image may be used as the low-quality image.

In addition, the system for transmitting and receiving the stereo image shown in FIG. 1 may include an apparatus to determine a compression format of a stereo image and a 3D stereo image synthesizing apparatus, to provide a high-quality 3DTV service. The image compression format determining apparatus and the 3D stereo image synthesizing apparatus will be described in detail with reference to FIGS. 3 and 5.

According to FIG. 1, the image transmitting and receiving system may include a database (DB) 10 to store 3D contents, a high-quality image encoding unit 20, a low-quality image encoding unit 30, a packetizing unit 40, and a multiplexing, unit (MUX) 60. For example, the high-quality image encoding unit 20 and the low-quality image encoding unit 30 may include various encoders such as a moving picture expert group (MPEG)-2 encoder, an H.264 encoder, and a high efficiency video coding (HEVC) encoder. For example, the 3D contents may include a 3D stereo image constituted by a left image as the high-quality image and a right image as the low-quality image. The packetizing unit 40 may include a high-quality image packetizer 41, a low-quality image packetizer 42, and an additional information packetizer 43. The image receiving system may further include a demultiplexing unit (DEMUX) 70, an image receiving unit 80, and a terminal 90 that reproduces images. A 2-dimensional (2D) HDTV 91, a mobile 2DTV 92, and a 3DTV 93 may be used as the terminal 90.

In the image transmitting system shown in FIG. 1, although spatro-temporal resolutions of the left image and the right image obtained from the image receiving system are equal, the low-quality image may be compressed by a much higher compression rate than the high-quality image. Here, the image transmitting system may transmit the compressed low-quality image through the second channel. For example, the second channel, as a mobile broadcasting channel, may include an ATSC in M/H channel, a DVB-H channel, a DVB-T2 mobile channel, a DVB-NGH channel, an ISDB-T one-seg channel, an ISDB-Tmm channel, a DVB-SH channel.

To increase the compression rate of the low-quality image, the image transmitting system may encode the high-quality image using a particular encoder and encode the low-quality image using an encoder having a compression performance at least twice that of the encoder encoding the high-quality image. Here, the image transmitting system may compress the low-quality image considering a spatial resolution, a temporal resolution, or a quantization noise level of the low-quality image with respect to the high-quality image. For example, the image transmitting system may encode the low-quality image by reducing the spatial resolution or the temporal resolution of the low-quality image or increasing the quantization noise level of the low-quality image.

When the resolution or the image quality between the low-quality image and the high-quality image is different, the image quality of a stereo image synthesized in the image receiving system may be reduced. That is when the spatial resolution is considered, although the spatial resolution is different between the high-quality image and the low-quality image, the stereo image may be considered to have a higher image quality between the high-quality image and the low-quality image due to a binocular suppression effect occurring when a person recognizes a stereo image. When the temporal resolution is considered, as the quantization noise level is different between the high-quality image and the low-quality image, the temporal resolution may be considered an average noise level. Here, the average noise level refers to a noise level corresponding to a mean of the quantization noise level of the high-quality image and the quantization noise level of the low-quality image.

Hereinafter, a structure for determining an image compression format considering the quantization noise, the temporal resolution, and the spatial resolution of the high-quality image and the low-quality image will be described in detail.

Figure 2:
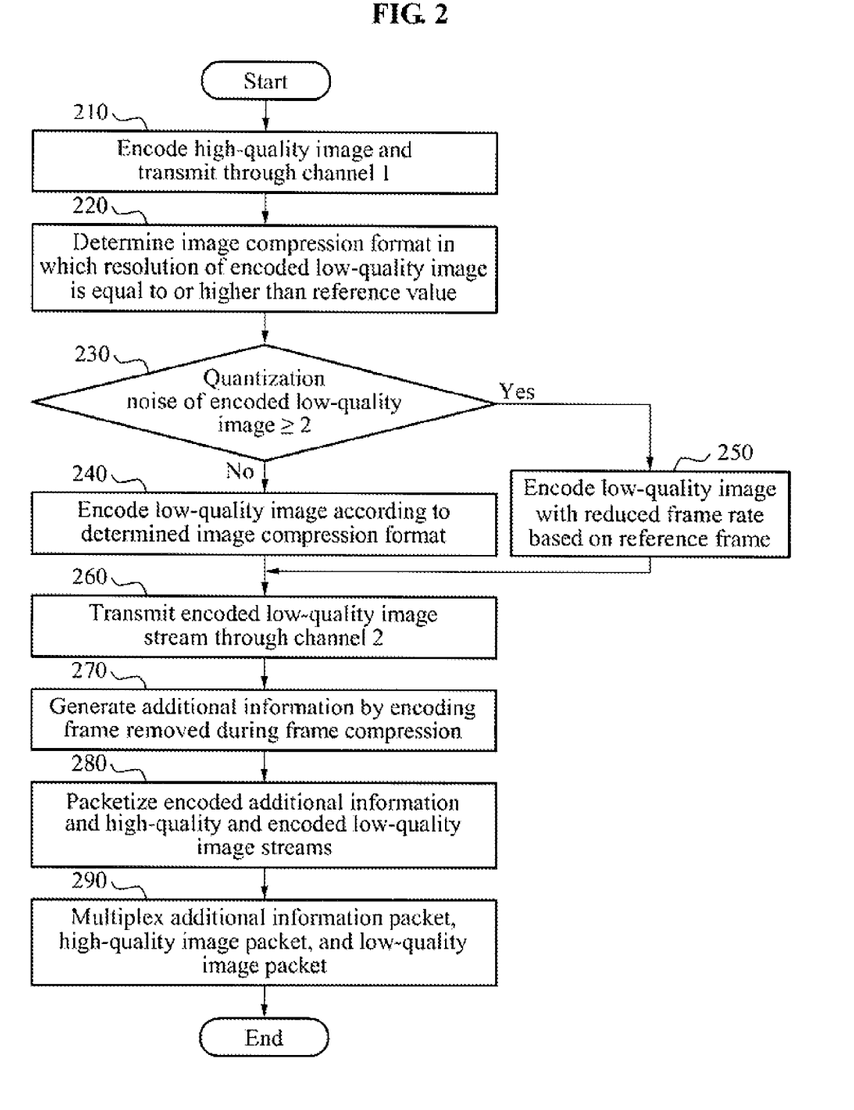
FIG. 2 is a flowchart illustrating a method of determining an image compression format, according to an embodiment of the present invention.

FIG. 2 is a flowchart illustrating a method of determining the image compression format, according to an embodiment of the present invention.

First, in operation 210, an image compression format determining apparatus may encode a high-quality image between a low-quality image and the high-quality image constituting a 3D stereo image. The image compression format determining apparatus may transmit the encoded high-quality image through a first channel. For example, the first channel, as a fixed broadcasting channel or a satellite broadcasting channel, may include an 8-VSB channel, a DVB-T channel, an ISDB-T channel, an ISDB-Tmm channel, a DVB-S2 channel, a DVB-T2 channel, and the like.

Here, the image compression format determining apparatus may encode the high-quality image to a highest resolution and image quality within an allowed range. For example, when the 8-VSB channel is used as the first channel, the image compression format determining apparatus may transmit the encoded high-quality image through the 8-VSB channel, allocating a widest bandwidth within a predetermined allowed bandwidth range.

In operation 220, the image compression format determining apparatus may determine the image compression format in which a resolution of the encoded low-quality image is higher than or equal to a predetermined reference value.

More specifically, the image compression format determining apparatus may compare horizontal resolutions between the encoded low-quality image and the encoded high-quality image. When the horizontal resolution of the encoded low-quality image is higher than or equal to a first reference value in comparison to a horizontal resolution of the encoded high-quality image, the image compression format determining apparatus may determine a codec corresponding to the first reference value or higher, to be the image compression format. That is, when the horizontal resolution of the encoded low-quality image is used, the codec used for encoding the low-quality image may be determined to be the image compression format. Here, the first reference value may be preset to ⅓.

Additionally, the image compression format determining apparatus may compare vertical resolutions between the encoded low-quality image and the encoded high-quality image. Here, when the vertical resolution of the encoded low-quality image is higher than or equal to a second reference value in comparison to the encoded high-quality image the image compression format determining apparatus may determine a codec corresponding to the second reference value or higher to be the image compression format. Here, the second reference value may be preset to ⅓.

For example, when the low-quality image is encoded using an advanced video codec (AVC) in accordance with ATSC A/153 standard, the spatial resolution of the encoded low-quality image is 416×240. As another example when the low-quality image is encoded using a scalable video codec (SVC), the spatial resolution of the encoded low-quality image is 624×360 or 832×348. Here, when the spatial resolution of the encoded high-quality image is 720 p or lower, the image compression format determining apparatus may determine the AVC corresponding to ½ of the spatial resolution of the encoded low-quality image. Therefore, the image compression format determining apparatus may encode the low-quality image using the AVC.

When the spatial resolution of the encoded high-quality image exceeds 720 p, the image compression format determining apparatus may determine the SVC corresponding to ½ of the spatial resolution of the encoded low-quality image. Therefore, the image compression format determining apparatus may encode the low-quality image using the SVC.

In operation 230, the image compression format determining apparatus may encode the low-quality image, based on the temporal resolution of the encoded low-quality image and an average power of the quantization noise. A frame rate may be applied as the temporal resolution.

For example, when encoding is performed by applying the same frame rate for the low-quality image and the high-quality image, the image compression format determining apparatus may calculate the average power of the quantization noise of the encoded low-quality image and the average power of the quantization noise of the encoded high-quality image, respectively. In addition, the image compression format determining apparatus may determine whether the average power of the quantization noise of the encoded low-quality image is higher than or equal to a reference number times the average power of the quantization noise of the encoded high-quality image. In this instance, the reference number may be preset to 2.

When the average power of the quantization noise of the encoded low-quality image is lower than the reference number of times for the average power of the quantization noise of the encoded high-quality image (230: NO), the image compression format determining apparatus may encode the low-quality image according to the determined image compression format in operation 240. That is, the low-quality image may be encoded according to the image compression format determined in operation 220.

When the average power of the quantization noise of the encoded low-quality image is higher than or equal to the predetermined number of times for the average power of the quantization noise of the encoded high-quality image (230: YES), the image compression format determining apparatus may encode the low-quality image by reducing the frame rate of the low-quality image based on a reference frame rate in operation 250. For example, the reference frame rate may be preset to ½. In this case, the image compression format determining apparatus may encode the low-quality image by about ½ a frame rate of the low-quality image. Here, the low-quality image may be encoded by about ½ the frame rate of the low-quality image according to the image compression format determined in operation 220.

Subsequently, in operation 260, the image compression format determining apparatus may transmit a stream related to the encoded low-quality image through the second channel. For example, when the ATSC M/H channel is used as the second channel, the image compression format determining apparatus may transmit the stream related to the encoded low-quality image through the ATSC M/H channel.

In operation 270, the image compression format determining apparatus may encode a frame removed during compression of frames constituting the low-quality image, and thereby generate additional information of the low-quality image.

For example, when the removed frame is encoded by a B-slice mode, the image compression format determining apparatus may generate the additional information the low-quality image by encoding the removed frame by the B-slice mode. Also, the image compression format determining apparatus may transmit the generated additional information through the first channel. Since the B-slice mode implements an image with a fewer number of bits than an I-slice mode or a P-slice mode, the image compression format determining apparatus may encode the removed frame by the B-slice mode. Therefore, when the B-slice mode does not use a fewer number of bits than the I-slice mode or the P-slice mode in implementing an image, the image compression format determining apparatus may use the I-slice mode or the P-slice mode.

In operation 280, the image compression format determining apparatus may packetize a stream related to the encoded high-quality image, the stream related to the encoded low-quality image, and encoded additional information. For example, when a left image is used as the high-quality image and a right image is used as the low-quality image, the stream related to the high-quality image may be expressed by a left image stream and the stream related to the low-quality image may be expressed by a right image stream.

The image compression format determining apparatus may insert sync information generated using a wall clock, in a header or a time stamp field of a packet. In addition, the image compression format determining apparatus may designate an additional information packet as a packet identifier (PID).

For example, the image compression format determining apparatus may packetize the stream related to the encoded high-quality image and the encoded additional information in units of a packetized elementary stream (PES). Therefore, the image compression format determining apparatus may insert the sync information in a presentation time stamp (PTS) field of a PES header. Here, the sync information may include PTS information.

As another example, the image compression format determining apparatus may packetize the stream related to the encoded low-quality image in units of an access unit (AU). In this case, the image compression format determining apparatus may insert the sync information in a time stamp field of a real-time control protocol (RTP) and a real-time transport control protocol (RTCP). That is, the image compression format determining apparatus may adjust the time stamp field of the RTP and the RTCP based on a PTS value. Here, it is presumed that the 3D stereo image synthesizing apparatus estimates the PTS using the time stamp field of the RTP and the RTCP according to the A/153 standard.

In operation 290, the image compression format determining apparatus may multiplex the additional information packet, the high-quality image packet, and the low-quality image packet. Here, the image compression format determining apparatus may modulate a multiplexed transmission stream and transmit an ATSC broadcasting signal to the 3D stereo image synthesizing apparatus.

Meanwhile, in operation 270, the image compression format determining apparatus may transmit the encoded additional information through the first channel for the following three reasons.

1) It is presumed that the ATSC M/H channel is used as the second channel, the in 8-VSB channel is used as the first channel, and the encoded additional information is transmitted through the ATSC M/H channel. In this case, channel encoding, for ex-ample, forward error correction (FEC) may be performed with a higher error correction efficiency than when the encoded additional is transmitted through the 8-VSB channel. When FEC having the high error correction efficiency is used, several parity check bits may be added during the channel encoding. Accordingly, when the M/H channel is used, length of the transmission stream may greatly increase in comparison to a case when the 8-VSB channel is used, to transmit the same number of information bits.

2) Furthermore, since the 3DTV service is provided in a fixed reception environment, an FEC having the high error correction efficiency is unnecessary. Therefore, it is more efficient to use the first channel, that is, the fixed broadcasting channel than the second channel, that is, the mobile broadcasting channel, when transmitting the encoded additional information.

3) In addition, the image compression format determining apparatus transmits the additional information packet located in a time slot of the first channel. In this instance, the image compression format determining apparatus may allocate a PID corresponding to a null packet of MPEG-2 TS to the additional information packet. In this case, an existing ATSC 1.0 receiving apparatus may decode the received transmission stream, ignoring the additional information packet. In addition, as the additional information packets are transmitted to a low-quality image decoding unit, a 3DTV receiver may restore a low-quality image having a frame rate about 2 times higher than the compressed image transmitted through the M/H channel. Although the additional information is explained as transmitted by being loaded to the null packet of the MPEG-2 TS, the additional information may be loaded to any of various other packets used for image compression besides the null packet of the MPEG-2 TS. For example, the additional information may be loaded to a digital stream having a. PID with an undefined service and transmitted.

Figure 3:
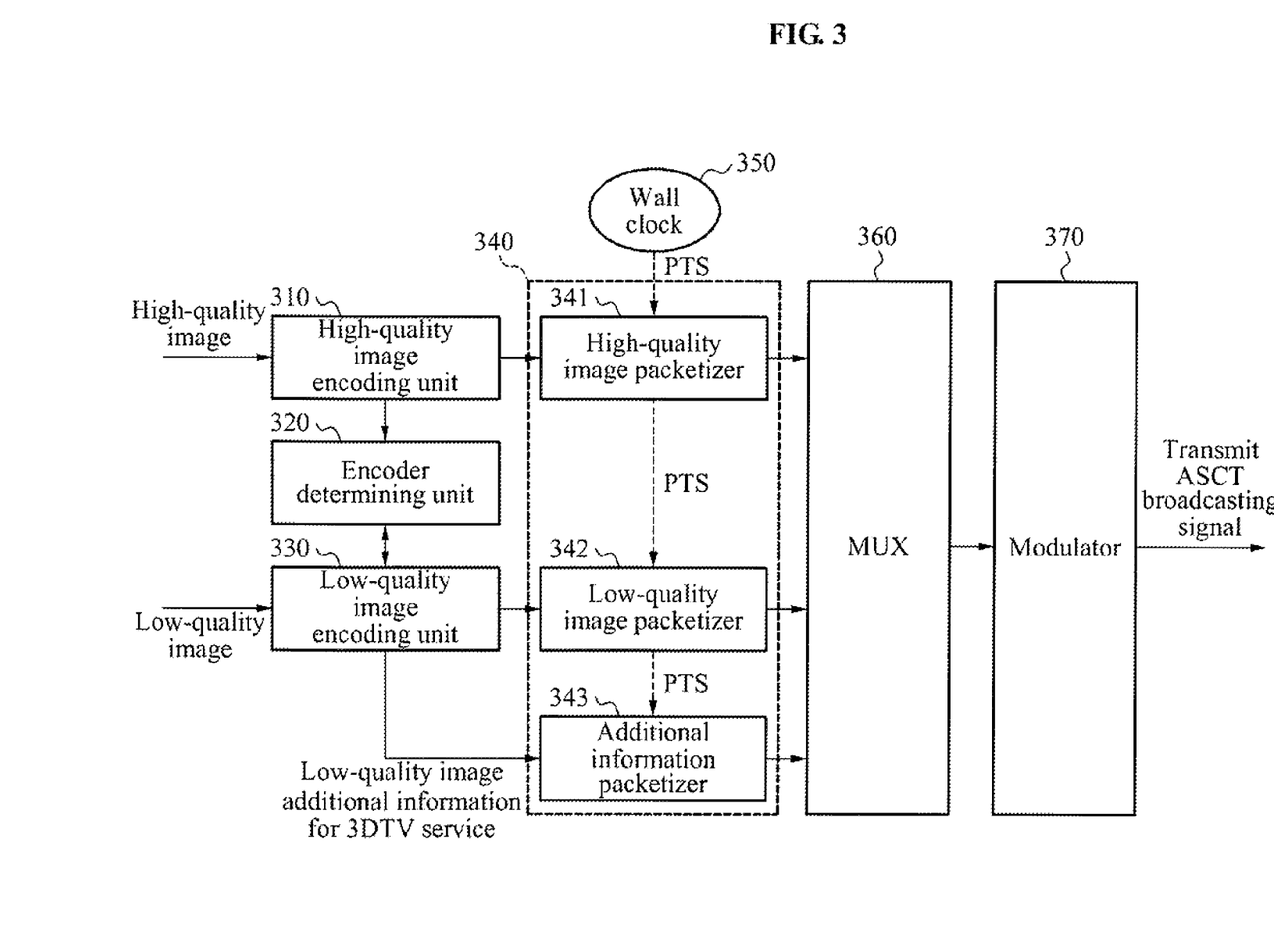
FIG. 3 is a block diagram illustrating a structure of an image compression format determining apparatus according to a first embodiment of the present invention.

FIG. 3 is a block diagram illustrating a structure of an image compression format determining apparatus 300 according to a first embodiment of the present invention. In FIG. 3, an MPEG-2 encoder is used as a high-quality image encoding unit whereas an H.264 encoder is used as a low-quality image encoding unit, however, the present embodiment is not limited thereto. Therefore, the MPEG-2 encoder, the H.264 encoder, an HEVC encoder, and the like may be used as the high-quality image encoding unit and the low-quality image encoding unit.

According to FIG. 3, the image compression format determining apparatus 300 may include a high-quality image encoding unit 310, an image compression format determining unit 320, a low-quality image encoding unit 330, a packetizing unit 340, a wall clock 350, a multiplexing unit 360, and a modulator 370. The image compression format determining apparatus 300 may load a 3D stereo image constituted by a high-quality image and a low-quality image from a database (DB).

Therefore, the high-quality image encoding unit 310 may encode the high-quality image to a highest resolution and image quality within a predetermined allowed range.

For example, when the MPEG-2 encoder is used as the high-quality image encoding unit 310, the high-quality image encoding unit 310 may encode the high-quality image using the MPEG-2 encoder. In addition, the high-quality image encoding unit 310 may transmit the encoded high-quality image through a first channel, by allocating a widest bandwidth within a predetermined allowed bandwidth range. Here, the first channel, as a fixed broadcasting channel that transmits images to a fixed terminal, may include an 8-VSB channel, a DVB-T channel, a DVB-T2 channel, an ISDB-T channel, a DVB-S2 channel, an ISDB-Tmm channel, and the like.

The image compression format determining unit 320 may determine the image compression format in which a resolution of an encoded low-quality image is greater than or equal to a reference value, in comparison to the encoded high-quality image.

For example, when a horizontal resolution of the encoded low-quality image is higher than or equal to a first reference value in comparison to a horizontal resolution of the encoded high-quality image, the image compression format determining unit 320 may determine a codec corresponding to the first reference value or higher, as the image compression format. Here, the first reference value may be preset to ⅓.

As another example, when a vertical resolution of the encoded low-quality image is higher than or equal to a second reference value in comparison to a vertical resolution of the encoded high-quality image the image compression format determining unit 320 may determine a codec corresponding to the second reference in value or higher, to be the image compression format. Here, the second reference value may be preset to ⅓.

As a further example, when encoding is performed by applying the same frame rate for the low-quality image and the high-quality image, the image compression format determining unit 320 may calculate an average power of a quantization noise of the encoded low-quality image and an average power of a quantization noise of the encoded high-quality image, respectively. In addition, the image compression format determining unit 320 may determine whether the average power of the quantization noise of the encoded low-quality image is higher than or equal to a reference number times the average power of the quantization noise of the encoded high-quality image, based on the calculated average powers. In this instance, the reference number may be preset to 2.

When the average power of the quantization noise of the encoded low-quality image is lower than the reference number times for the average power of the quantization noise of the encoded high-quality image, the low-quality image encoding unit 330 may encode the low-quality image according to the determined image compression format. In addition, when the average power of the quantization noise of the encoded low-quality image is higher than or equal to the predetermined number times the average power of the quantization noise of the encoded high-quality image, the low-quality image encoding unit 330 may encode the low-quality image by reducing the flame rate of the low-quality image based on a reference frame rate. Here, the reference frame rate may be preset to ½. That is, the low-quality image encoding unit 330 may encode the low-quality image by a ½ frame rate of the low-quality image.

Also, the low-quality image encoding unit 330 may encode a frame removed during compression of frames constituting the low-quality image, thereby generating additional information of the low-quality image.

For example, when a B-slice mode is used for encoding, the low-quality image encoding unit 330 may encode the removed frame by the B-slice mode and generate the additional information of the low-quality image. Additionally, the low-quality image encoding unit 330 may transmit the generated additional information through the first channel.

As another example, when an I-slice mode is used for encoding, the low-quality image encoding unit 330 may generate the additional information of the low-quality image by encoding the removed frame by the I-slice mode, and transmit the generated additional information through the first channel.

As a further example, when a P-slice mode is used for encoding, the low-quality image encoding unit 330 may generate the additional information of the low-quality image by encoding the removed frame by the P-slice mode, and transmit the generated additional information through the first channel.

The packetizing unit 340 may include a high-quality image packetizer 341, a low-quality image packetizer 342, and an additional information packetizer 343.

The high-quality image packetizer 341 may generate a high-quality image packet by packetizing a stream related to the encoded high-quality image in units of a first packet. Also the high-quality image packetizer 341 may insert sync information generated from the wall clock 350 in a header of the stream related to the high-quality image.

For example, when a PES is used as the first packet unit, the high-quality image packetizer 341 may packetize the stream related to the encoded high-quality image in units of the PES. In this case, a TS-M packet may be generated as the high-quality image packet through the packetizing. In addition, the high-quality image packetizer 341 may insert the sync information generated from the wall clock 350 in a PTS field of a PES header. Here, the sync information may include PTS information.

The low-quality image packetizer 342 may packetize a stream related to the encoded low-quality image in units of a second packet. The low-quality image packetizer 342 may insert the sync information generated from the all clock 350 in a time stamp filed.

For example, when an AU is used as the second packet unit, the low-quality image packetizer 342 may packetize the stream related to the encoded low-quality image in units of AU. Therefore, the M/H packet may be generated as a low-quality image packet through the packetizing. In addition, the low-quality image packetizer 342 may insert the sync information generated front the wall clock 350 in a time stamp field of an RIP and an RTCP. That is, the low-quality image packetizer 342 may adjust the time stamp field of the RIP and the RTCP based on the PTS value. Here, it is presumed that the 3D stereo image synthesizing apparatus estimates the PTS using the time stamp field of the RIP and the RTCP according to the A/153 standard.

The additional information packetizer 343 may packetize the encoded additional information in units of the first packet. For example, when the PES is used as the first packet unit, the additional information packetizer 343 may packet the encoded additional information in units of PES. In addition, in the same manner as in the high-quality image packet, the additional information packetizer 343 may insert the sync information generated from the wall clock 350 in the PTS field of the PES header. The additional information packetizer 343 may designate, as the PID, the additional information packet generated through the packetizing.

The multiplexing unit 360 may multiplex the high-quality image packet, the low-quality image packet, and the additional information packet. Therefore, the modulator 370 may modulate a multiplexed transmission stream and transmit an ATSC broadcasting signal to a 3D stereo image synthesizing apparatus 500. For example, the modulator 370 may include an 8-VSB modulator, an 8-VSB & mobile digital TV (MDTV) modulator, a DVB modulator, an ISDB modulator, and the like.

As described in the foregoing, with reference to FIGS. 2 and 3, the additional information has been explained as being packetized in units of the first packet and transmitted through the first channel which is the fixed broadcasting channel. However, the image compression format determining apparatus may packetize the additional information in units of the second packet and transmit the additional information through the second channel which is the mobile broadcasting channel. For example, when the AU is used as the second packet unit, the image compression format determining apparatus may packetize the additional information in units of the AU. Therefore, the time stamp field of the RTP generated by packetizing the additional information may be adjusted according to the PTS value.

Hereinafter, a process of restoring a high-quality image and a low-quality image by receiving an ATSC broadcasting signal, synthesizing the restored high-quality image and low-quality image, and thereby displaying a 3D image will be described with reference to FIGS. 4 and 5.

Figure 4:
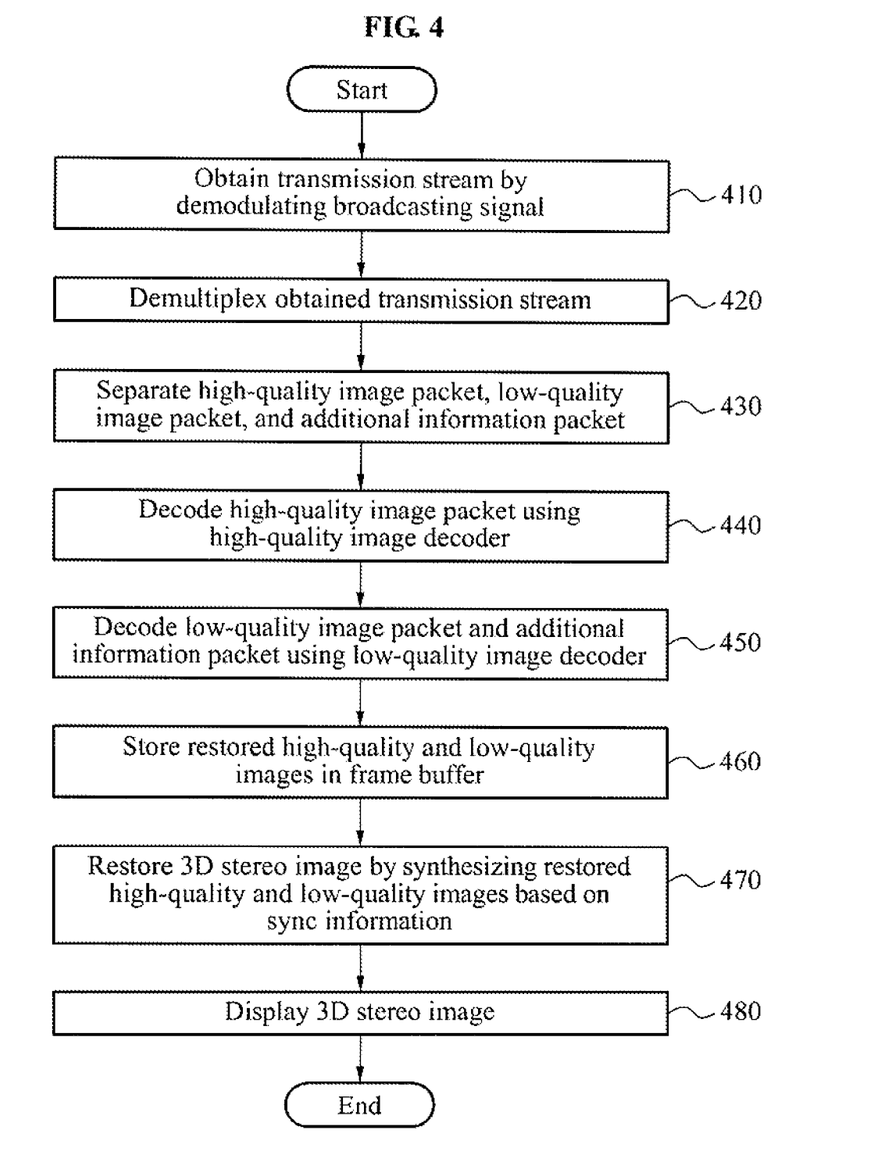
FIG. 4 is a flowchart illustrating a method of restoring and displaying a 3D stereo image, according to an embodiment of the present invention.

FIG. 4 is a flowchart illustrating a method of restoring and displaying a 3D stereo image, according to an embodiment of the present invention.

First, in operation 410, a 3D stereo image synthesizing apparatus may obtain a transmission stream 590 by demodulating an ATSC broadcasting signal. The transmission stream 590 may include high-quality image packets 591, additional information packets 592, and low-quality image packets 593. The ATSC broadcasting signal may include the low-quality image encoded in an image compression format determining apparatus based on at least one of a resolution of the encoded low-quality image and an average power of a quantization noise of the encoded low-quality image.

Next, in operation 420, the 3D stereo image synthesizing apparatus may demultiplex the transmission stream, in operation 430, the 3D stereo image synthesizing apparatus ma separate the transmission stream into the high-quality image packets the low-quality image packets, and the additional information packets using PIDs of respective packets constituting the transmission stream. That is, in a 3DTV reception mode, the 3D stereo image synthesizing apparatus may search for all the high-quality image packets, the low-quality image packets, and the additional information packets, and separate those packets from the transmission stream using the PIDs included in the transmission stream.

Here, the high-quality image packets refer to packets transmitted through a first channel in the image compression format determining apparatus. The first channel refers to a fixed broadcasting channel that transmits images to a fixed terminal. The first channel may include an 8-VSB channel, a DVB-T channel, a DVB-T2 channel, an ISDB-Tmm channel, an ISDB-T channel, and the like. When the 8-VSB channel is used as the first channel, the high-quality image packets may be 8-VSB packets.

The low-quality image packets refer to packets transmitted through a second channel in the image compression format determining apparatus. The second channel refers to a mobile broadcasting channel that transmits images to a mobile or portable terminal. The second channel may include an ATSC channel, a DVB-H channel, a DVB-T2 mobile channel, a DVB-NGH channel, an ISDB-T oneseg channel, an ISDB-Tmm channel, and the like. When the ATSC M/H channel is used as the second channel, the low-quality image packets may be M/H packets.

However, in a 2D broadcasting mode, the 3D stereo image synthesizing apparatus may recognize and receive only the high-quality image packets as a broadcasting signal using the PID included in the transmission stream, while discarding the low-quality image packets and the additional information packets.

During the demultiplexing, the 3D stereo image synthesizing apparatus may extract sync information from the transmission stream. For example, the sync information may include PTS information. The sync information may be inserted in headers of the high-quality image packets and the additional information packets, and also in time stamp fields of the low-quality image packets.

In operation 440, the 3D stereo image synthesizing apparatus may restore the high-quality image by decoding the high-quality image packets using a high-quality image decoder. For example, various decoders such as an MPEG-2 decoder may be used as the high-quality image decoder.

In operation 450, the 3D stereo image synthesizing apparatus may restore the low-quality image by decoding the low-quality image packets and the additional information packets using a low-quality image decoder. For example, various decoders such as an H.264 decoder may be used as the low-quality image decoder.

Therefore, in operation 460, the 3D stereo image synthesizing apparatus may store the restored high-quality image and the restored low-quality image in a frame buffer.

In operation 470, the 3D stereo image synthesizing apparatus may restore a 3D stereo image by synthesizing the restored high-quality image and the restored low-quality image based on the extracted sync information. For example, when the high-quality image is used as a left image and the low-quality image is used as a right image, the 3D stereo image synthesizing apparatus may restore the 3D stereo image by synthesizing the left image and the right image.

Next, in operation 480, the 3D stereo image synthesizing apparatus may display the restored 3D stereo image.

Thus, as described with reference to FIG. 3 although the high-quality image packets and the additional information packets, as main service packets, are received together through the fixed broadcasting channel such as the 8-VSB channel, since the demultiplexing using the PID of the transmission stream is performed, a conventional ATSC, receiver may separate the additional information packets from the transmission stream without requiring an additional function.

Figure 5:
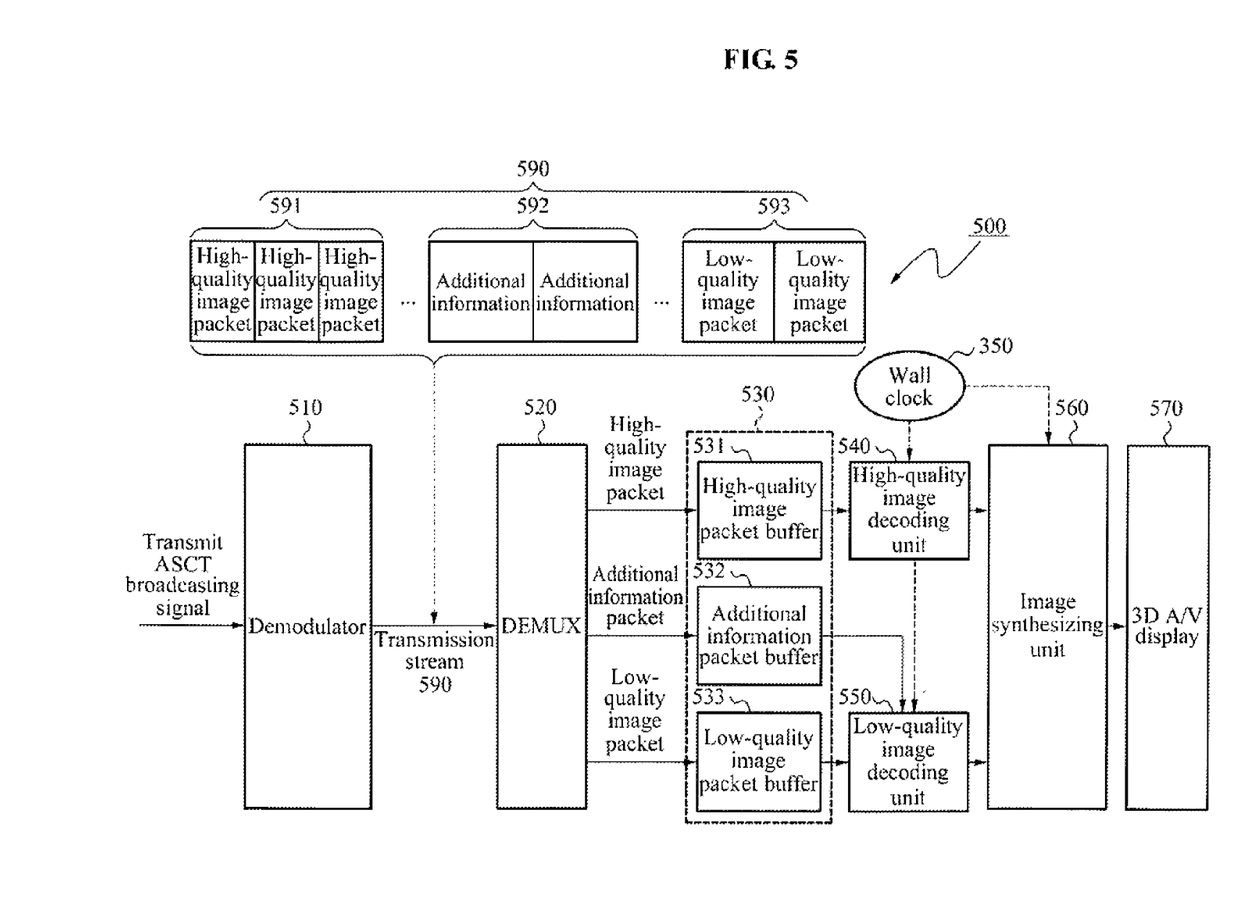
FIG. 5 is a block diagram illustrating a structure of a 3D stereo image synthesizing apparatus.

FIG. 5 is a block diagram illustrating a structure of a 3D stereo image synthesizing apparatus 500.

Referring to FIG. 5, the 3D stereo image synthesizing apparatus 500 may include a demodulator 510, a demultiplexing unit 520, a buffer 530, a high-quality image decoding unit 540, a low-quality image decoding unit 550, an image synthesizing unit 560, and a 3D A/V display 570.

The demodulator 510 may receive an ATSC broadcasting signal transmitted from an image compression format determining apparatus and demodulate the received ATSC broadcasting signal, thereby obtaining a transmission stream. The ATSC broadcasting signal may include a low-quality image encoded in the image compression format determining apparatus, based on at least one of a resolution of the encoded low-quality image and an average power of a quantization noise of the encoded low-quality image. In addition, a transmission stream 590 may include the high-quality image packets 591, the additional information packets 592, and the low-quality image packets 593. The demodulator 510 may include an 8-VSB demodulator. Also, an 8-VSB & MDTV demodulator, a DVB demodulator, an ISDB demodulator, and the like may be used as the demodulator 510.

The demultiplexing unit 520 may demultiplex the obtained transmission stream, thereby separating the additional information packet, the high-quality image packets and the low-quality image packets from the transmission stream. In this instance, the demultiplexing unit 520 may extract sync information from the transmission stream. The sync information may be inserted in headers of the high-quality image packets and the low-quality image packets, and also in time stamp fields of the additional information packets. For example, the sync information may include PTS information.

In particular, the demultiplexing, unit 520 may separate the additional information packets, the high-quality image packets, and the low-quality image packets using PIDs included in the transmission stream. Thus, the demultiplexing unit 520 for a 3DTV is distinctive from the conventional demultiplexing unit for a 2DTV in terms of separating the additional information packets for a 3DTV service without ignoring PIDs of MPEG-TS null packets.

The separated packets may be stored in corresponding buffers 530, respectively. For example, the high-quality image packets are stored in a high-quality image packet buffer 531, the low-quality image packets are stored in a low-quality image packet buffer 533, and the additional information packets are stored in an additional in formation packet buffer 532.

The high-quality image decoding unit 540 may decode the high-quality image packets stored in the high-quality image packet buffer 531, thereby restoring a high-quality image. For example, the high-quality image decoding unit 540 may decode the high-quality image packets using an MPEG-2 decoder. The high-quality image decoding unit 540 may use various other decoders to decode the high-quality image packets.

Also, the low-quality image decoding unit 540 may decode the low-quality image packets stored in the low-quality image packet buffer 533 and the additional information packets stored in the additional information packet buffer 532, thereby restoring a low-quality image. For example, the low-quality image decoding unit 540 may decode the low-quality image resolutions and the additional information packets using an H.264 decoder. The high-quality image decoding unit 540 may use various other decoders to decode the high-quality image packets.

The image synthesizing unit 560 may restore a 3D stereo image by synthesizing the restored low-quality image and the restored high-quality image based on the sync information. The 3D A/V display 570 may display the restored 3D stereo image.

The high-quality image may be any one of the high-quality image and the low-quality image. The low-quality image may be a remaining one of the high-quality image and the low-quality image, except the image corresponding to the high-quality image.

For example, when the high-quality image is used as a left image, the low-quality image may be used as a right image. When the low-quality image is used as a left image, the high-quality image may be used as a right image. Therefore, the image synthesizing unit 560 may restore the 3D stereo image by synthesizing a restored left image and a restored right image.

The above-described structure has been explained to use the MPEG-2 codec in the high-quality image encoding unit and the high-quality image decoding unit and use the H.264 codec in the low-quality image encoding unit and the low-quality image decoding unit. However, the high-quality image encoding unit and the high-quality image decoding unit may be a layered video codec for encoding and decoding the high-quality image. Also, a layered video codec for encoding and decoding the low-quality in image may be used as the low-quality image encoding unit and the low-quality image decoding unit. For example, the layered video codec may include an HEVC, an SVC, and an H.264 codec.

In addition, although the high-quality image is used as the left image while the low-quality image is used as the right image in the foregoing description, the low-quality image may be used as the left image while the high-quality image is used as the right image.

The stream related to the high-quality image and the stream related to the low-quality image described in the foregoing are in the form of a digital stream. The additional information may be loaded to the digital stream and transmitted to the 3D stereo image synthesizing apparatus. That is the image compression format determining apparatus according to the embodiments of the present invention may transmit the additional information by loading the additional information to the stream related to the high-quality image or to the stream related to the low-quality image.

Figure 6:
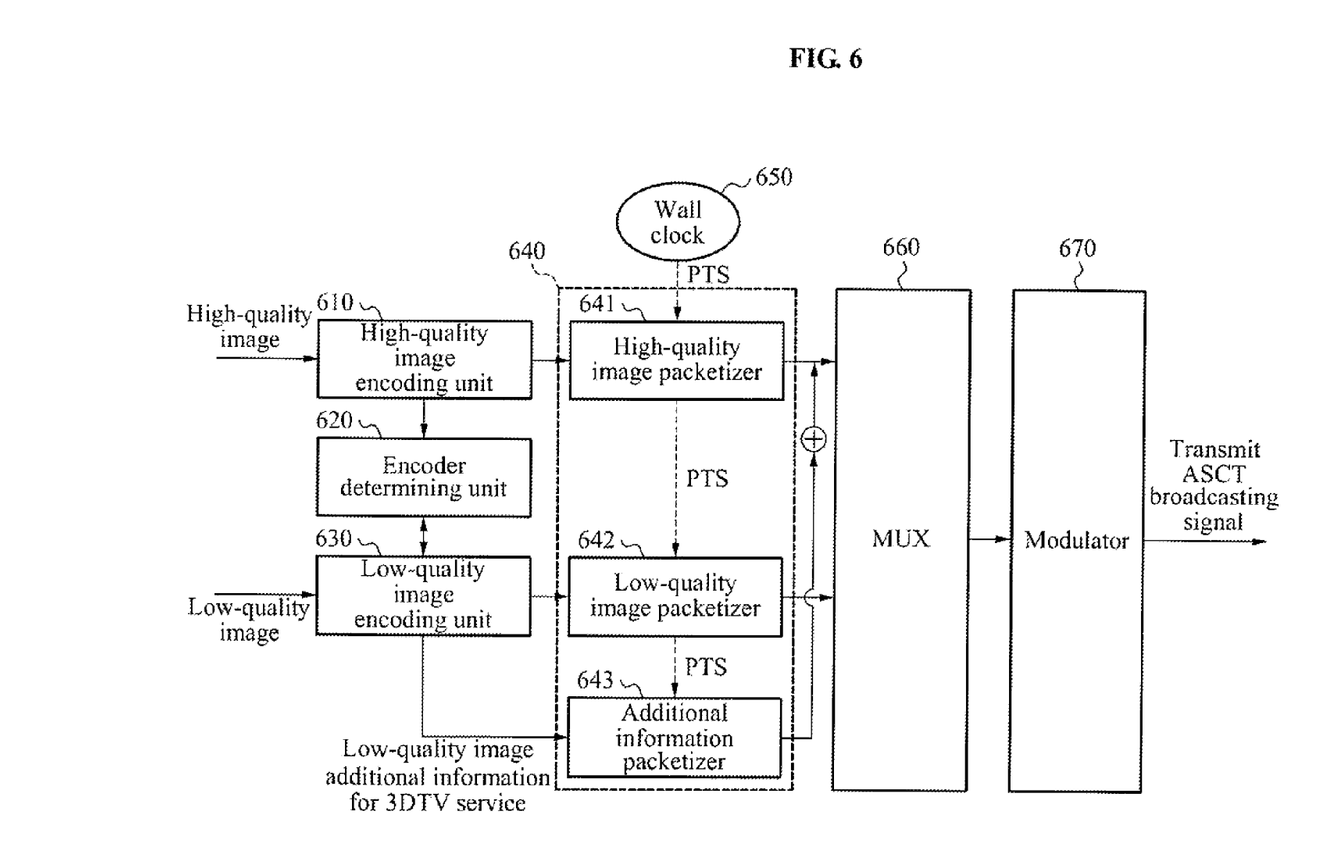
FIG. 6 is a block diagram illustrating a structure of an image compression format determining apparatus according to a second embodiment of the present invention.
Figure 7:
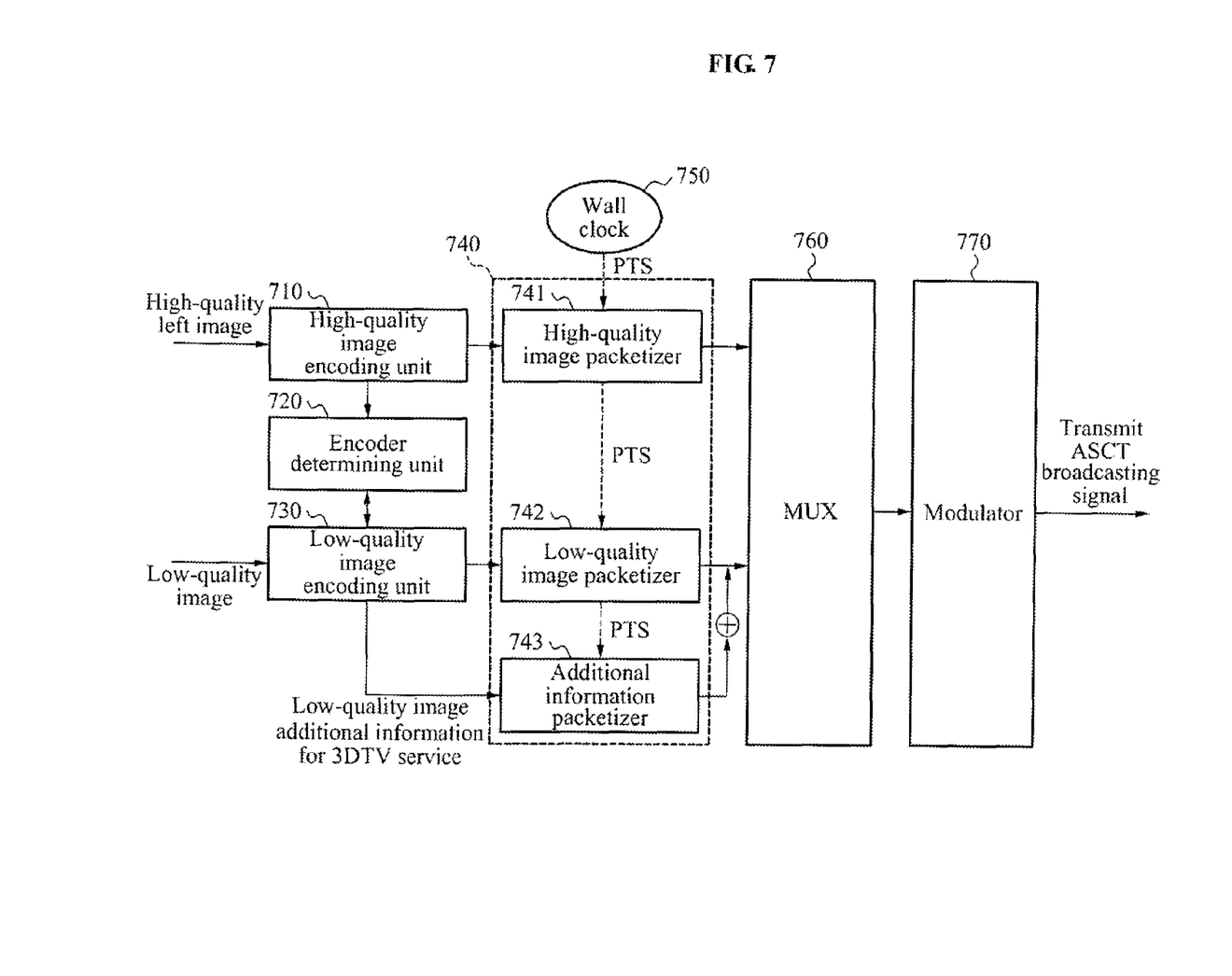
FIG. 7 is a block diagram illustrating a structure of an image compression format determining apparatus according to a third embodiment of the present invention.

For example, referring to FIG. 6, the high-quality image packet generated in a high-quality image packetizer 641 may be transmitted to the 3D stereo image synthesizing apparatus along with the additional information packets generated in an additional information packetizer 643. In the same manner, referring to FIG. 7, the low-quality image packets generated in a low-quality image packetizer 742 and the additional information packets generated in an additional information packetizer 743 may be transmitted to the 3D stereo image synthesizing apparatus together. The additional information may be transmitted more efficiently when loaded to the stream related to the high-quality image than when loaded to the stream related to the low-quality image.

The additional information may include enhancement layer information of the SVC, 3D depth information, disparity map information, multiview 3D depth information, and multiview 3D image information.

In addition, although the first channel is explained as the fixed broadcasting channel, the high-quality image may include images supporting a satellite broadcasting channel besides the fixed broadcasting channel. When the satellite broadcasting service is used, the satellite broadcasting channel may be used as the first channel.

Although a few embodiments of the present invention have been shown and described, the present invention is not limited to the described embodiments.

Instead, it would be appreciated by those skilled in the art that changes may be made to these embodiments without departing from the principles and spirit of the invention, the scope of which is defined by the claims and their equivalents.

The invention claimed is:

1. A method of determining an image compression format, the method comprising:
encoding a high-quality image comprised in a 3-dimensional (3D) stereo image, wherein the 3D stereo image comprises the high-quality image and a low-quality image;
determining an image compression format in which a resolution of an encoded low-quality image is higher than or equal to a reference value based upon a resolution of the encoded high-quality image;
encoding the low-quality image according to the determined image compression format;
transmitting the encoded high-quality image through a first channel; and
transmitting the encoded low-quality image through a second channel.

2. The method of claim 1, wherein the determining of the image compression format comprises: determining the image compression format in which a horizontal resolution of the encoded low-quality image is higher than or equal to a first reference value in comparison to a horizontal resolution of the encoded high-quality image.

3. The method of claim 1, wherein the determining of the image compression format comprises: determining the image compression format in which a vertical resolution of the low-quality image is higher than or equal to a second reference value in comparison to a vertical resolution of the encoded high-quality image.

4. The method of claim 1, wherein the determining of the image compression format comprises;
calculating an average power of quantization noise ratio of the encoded low-quality image;
calculating an average power of quantization noise ratio of the encoded high-quality image; and
determining whether the average power of the low-quality image is higher than or equal to a predetermined number times the average power of the high-quality image.

5. The method of claim 4, wherein the encoding of the low-quality image comprises: reducing a frame rate of the low-quality image based on a reference frame rate as the average power of the low-quality image is determined to be higher than or equal to the predetermined number times the average power of the high-quality image.

6. The method of claim 4, wherein the encoding of the low-quality image comprises: encoding the low-quality image according to the determined image compression format as the average power of the low-quality image is determined to be lower than the predetermined number times for the average power of the high-quality image.

7. The method of claim 1, wherein the encoding of the low-quality image comprises:
generating additional information of the low-quality image based on a frame removed during encoding of the low-quality image; and
encoding the generated additional information.

8. The method of claim 7, further comprising: transmitting the encoded additional information through any one of the first channel and the second channel.

9. The method of claim 7, wherein the additional information comprises at least one of enhancement layer information of a scalable video codec (SVC), 3D depth information, disparity map information, multiview 3D depth information, and multiview 3D image information.

10. The method of claim 1, wherein the encoding of the high-quality image comprises: encoding the high-quality image to a highest resolution and image quality within a predetermined allowed range.

11. The method of claim 1, further comprising: transmitting sync information used for restoring the 3D stereo image by synthesizing the high-quality image transmitted through the first channel and the low-quality image transmitted through the second channel.

12. The method of claim 1, wherein the high-quality image is one of the high-quality image and the low-quality image whereas the low-quality image is a remaining one of the high-quality image and the low-quality image, except the image corresponding to the high-quality image.

13. The method of claim 1, wherein the first channel comprises a fixed broadcasting channel used for transmitting the high-quality image, and the second channel comprises a mobile broadcasting channel used for transmitting the low-quality image.

14. An apparatus for determining an image compression format, the apparatus comprising:
a high-quality image encoding unit to encode a high-quality image comprised in a 3-dimensional (3D) stereo image, wherein the 3D stereo image comprises the high-quality image and a quality image, and to transmit the encoded high-quality image through a first channel;
an image compression format determining unit to determine an image compression format in which a resolution of the encoded low-quality image is higher than or equal to a reference value based upon a resolution of the encoded the high-quality image; and
a low-quality image encoding unit to encode the low-quality image according to the determined image compression format and to transmit the encoded high-quality image through a second channel.

15. The method of claim 14, wherein the image compression format determining unit determines the image compression format in which a horizontal resolution of the encoded low-quality image is higher than or equal to a first reference value in comparison to a horizontal resolution of the encoded high-quality image.

16. The method of claim 14, wherein the image compression format determining unit determines the image compression format in which a vertical resolution of the low-quality image is higher than or equal to a second reference value in comparison to a vertical resolution of the encoded high-quality image.

17. The method of claim 14, wherein the image compression format determining unit calculates an average power of quantization noise ratio of the encoded low-quality image and an average power of quantization noise ratio of the encoded high-quality image, and determines whether the average power of the low-quality image is higher than or equal to a predetermined number times the average power of the high-quality image.

18. The method of claim 17, wherein the low-quality image encoding unit performs encoding by reducing a frame rate of the low-quality image based on a reference frame rate as the average power of the low-quality image is determined to be higher than or equal to the predetermined number times the average power of the high-quality image, and the low-quality image encoding unit encodes the low-quality image according to the determined image compression format as the average power of the low-quality image is determined to be lower than the predetermined number times for the average power of the high-quality image.

19. The method of claim 14, wherein the low-quality image encoding unit generates additional information of the low-quality image based on a frame removed during encoding of the low-quality image, encodes the generated additional information, and transmits the encoded additional information through the first channel.

20. The method of claim 19, wherein the additional information comprises at least one of enhancement layer information of a scalable video codec (SVC), 3D depth information, disparity map information, multiview 3D depth information, and multiview 3D image information.

21. The method of claim 14, wherein the high-quality image is one of the high-quality image and the low-quality image whereas the low-quality image is a remaining one of the high-quality image and the low-quality image, except the image corresponding to the high-quality image, the first channel comprises a fixed broadcasting channel or a satellite broadcasting channel used for transmitting the high-quality image, and the second channel comprises a mobile broadcasting channel used for transmitting the low-quality image.

22. A method of synthesizing a 3-dimensional (3D) stereo image, the method comprising:
separating a high-quality image packet, a low-quality image packet, and an additional information packet by demultiplexing the transmission stream;
restoring a high-quality image by decoding the high-quality image packet; restoring a low-quality image by decoding the low-quality image packet;
synthesizing the restored high-quality image and the restored low-quality image; and displaying the 3D stereo image restored through the synthesizing, wherein the restored high-quality image is used as first view image of the 3D stereo image and the restored low-quality image is used as a second view image of the 3D stereo image, and wherein the first view image is different from the second view image.

23. The method of claim 22, further comprising:

obtaining the transmission stream by demodulating a broadcasting signal, wherein the broadcasting signal comprises the low-quality image encoded based on at least one of a resolution of the encoded low-quality image and an average power of quantization noise ratio of the encoded low-quality image.

24. The method of claim 22, wherein the synthesizing comprises synthesizing the restored high-quality image and the restored low-quality image based upon sync information, and wherein the sync information comprises presentation time stamp (PTS) information, the sync information is inserted in a header of the high-quality image packet, the sync information is inserted in a time stamp field of the low-quality image packet, and the sync information is inserted in a header of the additional information packet.

25. The method of claim 22, wherein the additional information comprises at least one of enhancement layer information of a scalable video codec (SVC), 3D depth information, disparity map information, multiview 3D depth information, and multiview 3D image information.

26. An apparatus for synthesizing a 3-dimensional (3D) stereo image, the apparatus comprising:

a demultiplexing unit to separate a high-quality image packet, a low-quality image packet, and an additional information packet by demultiplexing the transmission stream;

a high-quality image decoding unit to restore a high-quality image by decoding the high-quality image packet;

a low-quality image decoding unit to restore a low-quality image by decoding the low-quality image packet;

an image synthesizing unit to synthesize the restored high-quality image and the restored low-quality image; and a 3D audio and video (A/V) display unit to display the 3D stereo image generated through the synthesizing, wherein the restored high-quality image is used as first view image of the 3D stereo image and the restored low-quality image is used as a second view image of the 3D stereo image, and wherein the first view image is different from the second view image.

* * * * *